(12) United States Patent
Glomset et al.

(10) Patent No.: US 10,994,251 B2
(45) Date of Patent: May 4, 2021

(54) INTEGRATED OXYGEN PROBE IN SUBMERSIBLE OXYGENATION DEVICE

(71) Applicant: LINDE AKTIENGESELLSCHAFT, Munich (DE)

(72) Inventors: Kenneth Glomset, Alesund (NO); Stefan Dullstein, Neufahrn (DE); Thomas Loevold Hellebust, Valderoey (NO); John Bertil Aakernes, Aalesund (NO)

(73) Assignee: Praxair Technology, Inc., Danbury, CT (US)

( * ) Notice: Subject to any disclaimer, the term of this patent is extended or adjusted under 35 U.S.C. 154(b) by 226 days.

(21) Appl. No.: 16/327,487

(22) PCT Filed: Aug. 24, 2017

(86) PCT No.: PCT/EP2017/025240
§ 371 (c)(1),
(2) Date: Feb. 22, 2019

(87) PCT Pub. No.: WO2018/041412
PCT Pub. Date: Mar. 8, 2018

(65) Prior Publication Data
US 2019/0176104 A1    Jun. 13, 2019

(30) Foreign Application Priority Data

Sep. 1, 2016 (EP) .................... 16001909

(51) Int. Cl.
| C02F 1/72 | (2006.01) |
| B01F 5/04 | (2006.01) |
| B01F 15/00 | (2006.01) |
| B01F 3/04 | (2006.01) |
| B01D 47/00 | (2006.01) |
| A01K 63/04 | (2006.01) |
| C02F 7/00 | (2006.01) |
| B01D 47/10 | (2006.01) |

(52) U.S. Cl.
CPC ........ B01F 15/0022 (2013.01); A01K 63/042 (2013.01); B01D 47/00 (2013.01);
(Continued)

(58) Field of Classification Search
CPC .... B01F 3/04; B01F 3/04241; B01F 3/04099; B01F 3/0446; B01F 35/0428;
(Continued)

(56) References Cited

U.S. PATENT DOCUMENTS

| 3,547,811 A | 12/1970 | McWhirter |
| 3,983,031 A | 9/1976 | Kirk |

(Continued)

FOREIGN PATENT DOCUMENTS

| CN | 204 697 754 U | 10/2015 |
| CN | 105 320 187 A | 2/2016 |

(Continued)

OTHER PUBLICATIONS

European Search Report for EP 16001909.7-1655, dated Feb. 7, 2017, 7 pages.

(Continued)

*Primary Examiner* — Robert A Hopkins
(74) *Attorney, Agent, or Firm* — Donald T. Black

(57) ABSTRACT

A device (1) for dissolving a gas (G) in water (W) is provided, and includes a housing (100) configured to be submerged into the water (W) with the housing (100) having at least one water inlet (101), a gas inlet (102) and at least one water outlet (103) for discharging gas enriched water out of the housing (100), a pump (5) in fluid communication with the at least one water inlet (10) for sucking water (W) from a surrounding of the housing (100), the pump config- (Continued)

Figure 1:
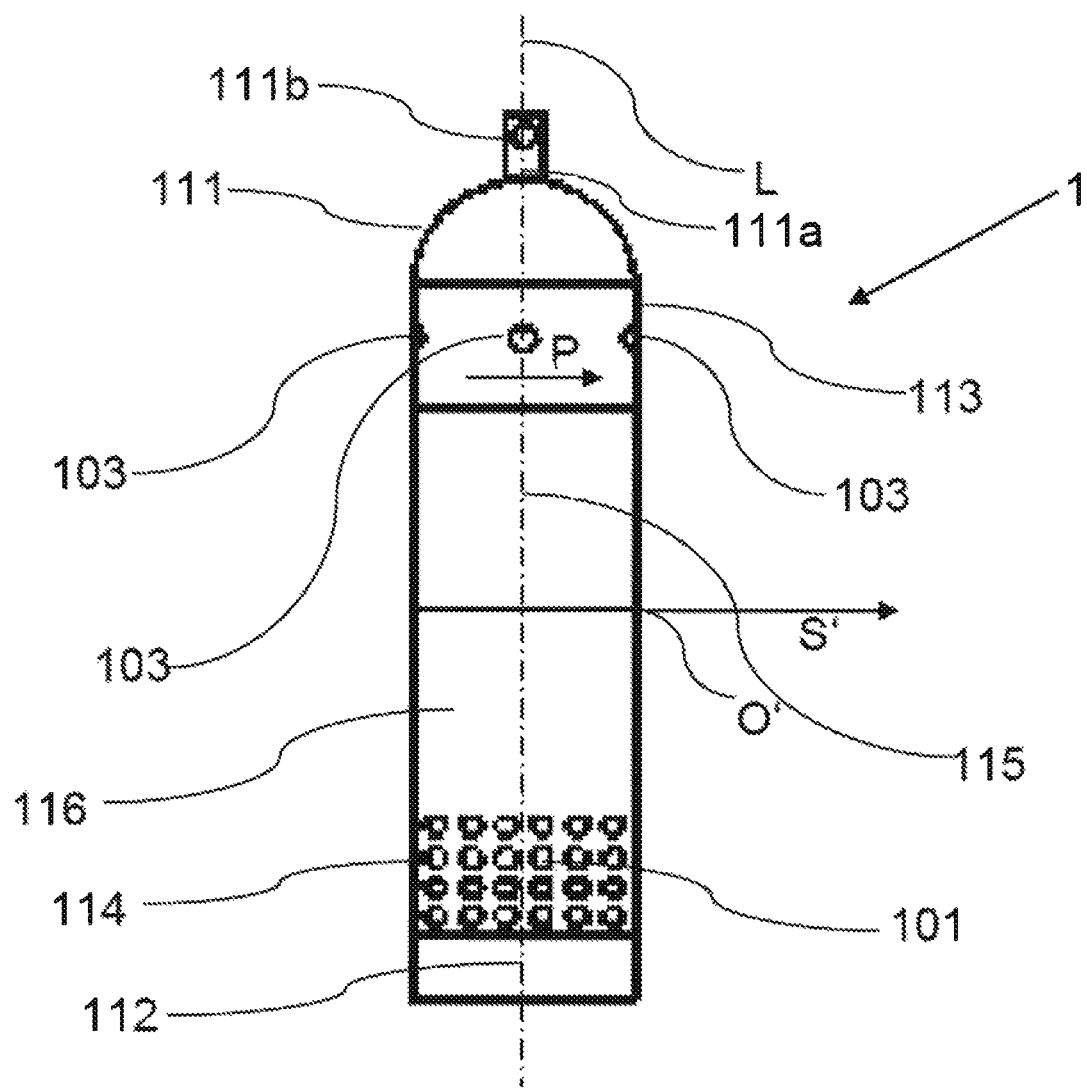

ured to generate a main water stream (S'), and means for injecting the gas (G) supplied via the gas inlet (102) into the main water stream (S'). The device (1) includes a probe (6) configured to measure a concentration of the gas dissolved in water, and the probe (6) is arranged in the housing (100) of the device (1).

9 Claims, 3 Drawing Sheets

(52) U.S. Cl.
 CPC ............ *B01D 47/10* (2013.01); *B01F 3/0446* (2013.01); *B01F 3/0451* (2013.01); *B01F 3/04099* (2013.01); *B01F 5/0428* (2013.01); *C02F 1/72* (2013.01); *C02F 7/00* (2013.01); *C02F 2209/22* (2013.01)

(58) Field of Classification Search
 CPC ........ B01F 15/0022; C02F 1/72; C02F 1/008; B01D 47/00; B01D 47/10
 See application file for complete search history.

(56) References Cited

U.S. PATENT DOCUMENTS

| | | | | |
|---|---|---|---|---|
| 5,582,777 | A | * | 12/1996 | Vento .................. A01K 63/042 261/121.2 |
| 2011/0309034 | A1 | | 12/2011 | Yousfan et al. |
| 2016/0289088 | A1 | * | 10/2016 | Mo ........................ C02F 1/008 |

FOREIGN PATENT DOCUMENTS

| | | |
|---|---|---|
| WO | WO 2011/150463 A1 | 12/2011 |
| WO | WO 2018/041413 A8 | 3/2018 |

OTHER PUBLICATIONS

International Search Report for PCT/EP2017/025241, dated Nov. 22, 2017, Authorized Officer: Ismail Utku Kiyak, 2 pgs.
International Search Report for PCT/EP2017/025240, dated Nov. 8, 2017, Authorized Officer: Lucia Batres Arnal, 2 pgs.

\* cited by examiner

INTEGRATED OXYGEN PROBE IN SUBMERSIBLE OXYGENATION DEVICE

The invention relates to a device for dissolving a gas, particularly oxygen, in water, for instance in water residing in an open sea cage used for fish farming. Furthermore, the invention relates to a corresponding method.

When using such oxygenation systems for dissolving gas in water, the dosage of oxygen is generally controlled via an oxygen probe that is configured to measure the concentration of dissolved oxygen in the water in the vicinity of the sensor.

Traditionally, the oxygen saturation is measured by handheld oxygen probes. This often limits the measuring position to the outer rim of the production volume (e.g. sea cage etc.). Furthermore, oxygen probes usually need a certain water flow over the measuring surface (e.g. membrane or optical surface) of the probe which is rather difficult to achieve using hand-held probes. Furthermore, using a hand-held probe it is also difficult to maintain a constant distance to a point where oxygen is dissolved in the water, which constant distance is favourable in order to get reproducible measurements.

Based on the above, the problem underlying the present invention is to provide a device for dissolving a gas, particularly oxygen, into the water and a probe, particularly oxygen probe, that remedy the above stated difficulties.

This problem is solved by a device having the features of claim 1.

Preferred embodiments of the device are stated in the corresponding sub-claims and are described below.

According to claim 1, a device for dissolving a gas in water is disclosed, comprising:
- a housing, that is configured to be submerged into the water, wherein the housing comprises at least one water inlet, a gas inlet and at least one water outlet for discharging gas enriched water out of the housing,
- a pump that is in fluid communication with the at least one water inlet for sucking water from a surrounding of the housing, wherein the pump is configured to generate a main water stream,
- a means for injecting said gas supplied via said gas inlet into said main water stream (particularly downstream of the pump and upstream of said at least one water outlet, wherein particularly the gas enriched main water stream is discharged out of the housing through the at least one water outlet)

wherein, according to the invention, the device comprises a probe configured to measure a concentration of said gas dissolved in water, wherein said probe is arranged in the housing of the device.

Thus, the invention allows to measure the oxygen concentration in the raw water getting into the device.

Moreover, particularly, the invention ensures that the measuring point and the oxygenating point always have the relation/distance to each other and can further be maneuvered to any position in the production volume.

Further, due to the fact that the probe is now integrated into the device, one can prevent that the probe gets hooked up to surrounding material, particularly fish nets and the like.

Particularly, in an embodiment, said means for injecting the gas can be a Venturi nozzle that is in fluid communication with the pump on one end and with the at least one water outlet on the other end, wherein the nozzle comprises a constriction, wherein in the region of the constriction a fluid connection to said gas inlet is provide via which gas is sucked into the Venturi nozzle. Thus the nozzle ejects a gas enriched main water stream that is then discharged through the at least one water outlet, or divided into a number of partial streams that are discharged via a corresponding number of water outlets.

According to a preferred embodiment of the present invention said gas is oxygen, wherein said probe is an oxygen probe that is configured to measure a concentration of dissolved oxygen in water.

Further, according to a preferred embodiment of the present invention, the probe comprises a measuring surface for measuring said concentration, particularly at a tip of said probe.

Further, according to a preferred embodiment of the present invention, the device is configured to direct a side water stream of the main water stream along said measuring surface.

Thus, particularly, the invention ensures that only non-oxygenated water gets measured.

Furthermore, particularly, due to the arrangement and operation mode the design further reduces possible fouling on the probe to a minimum.

Further, according to an embodiment, the device is configured to divert said side water stream from the main water stream downstream of the pump and upstream of the means for injecting said gas into the main water stream.

Further, according to a preferred embodiment of the present invention, for generating said side water stream, the device comprises a first orifice of a conduit at a junction between a pump outlet pipe and said means, particularly a Venturi nozzle, particularly at a location where said main water stream hits an inner surface of the device, which surface can be an inner surface of said Venturi nozzle that extends inwards up to the constriction of the Venturi nozzle such that said side water stream is forced through the first orifice, is flushed over the measuring surface of the probe, and is lead through a second orifice out of said conduit and thereby exits the housing. Said means (e.g. Venturi nozzle) is particularly comprised by a main body (also called nozzle section) of the device.

Further, according to a preferred embodiment of the present invention, the probe is configured to be arranged in a recess of the housing in a removable fashion, particularly such that when the probe is arranged in said recess, the measuring surface forms a region of an inner side of said conduit and is arranged downstream the first orifice and upstream the second orifice of said conduit so that said side water stream can be flushed over said measuring surface when it is passed through said conduit.

Further, according to a preferred embodiment of the present invention, the device comprises a closure means (e.g. a plastic part) that is configured to be arranged in a form fitting manner in said recess when the probe has been removed from the recess, wherein the closure means closes, particularly seals, the first orifice when it is arranged in the recess as intended, so that particularly no side water stream is generated.

Particularly, the water outlets of the device are arranged on the housing such that upon discharging water (e.g. the main water stream) through said water outlets out of the housing, the repulsive forces cancel each other so that the housing can maintain essentially a constant position when submerged in water (apart from movements due to water drift).

Furthermore, the device particularly comprises a means for suspending the device at the top of the housing, particularly in the form of an eye.

A further aspect of the present invention relates to a method for dissolving a gas, particularly oxygen, in water using a device according to the invention, wherein the device is submerged in the water, wherein gas is injected into the main water stream, and the gas enriched main water stream is discharged into the water surrounding the device.

Particularly, according to an embodiment, the flow rate of the gas injected into the main water stream is controlled depending on the concentration of the dissolved gas in the water.

Furthermore, according to an embodiment, said water in which the device is submerged is waste water or a stretch of water.

Further, according to an embodiment, said water in which the device is submerged is one of: water in a cage, water in an open sea cage, water in a sealed sea cage (e.g. sealed with a tarpaulin), water in a partly sealed sea cage (e.g. a sea cage with a skirt), water in a container, or water in a pond, wherein particularly said cages are arranged in a stretch of water, particularly in a lake or in a sea.

Due to the invention, a reduced maintenance of the oxygen probe can be achieved since the latter provides a self-cleaning of its tip due to the side water stream that flushes over the measuring surface.

Furthermore, since the probe is integrated into the housing, the device according to the invention comprises an improved handling.

In addition, the integration of the probe into the housing of the device protects the probe and reduces the risk of damaging the probe upon use of the device/probe.

Furthermore, the oxygen concentration is measured exactly at the location of the oxygen dosing, which allows the user to actually see the correct oxygen concentration and the course of the dosage.

Further, the relationship between the dosing point and the oxygen probe is always the same which reduces the risk of individual measuring and dosing deviation.

Finally, the invention ensures a steady water flow over the measuring surface of the probe. This improves the reliability of the oxygen reading.

The principle according to the invention also works for other probes. For instance, the present device may also be used for the application of neutralization. Here, the probe could be replaced by a pH probe and said gas to be dissolved in the water by means of the device can be carbon dioxide.

Figure 2:
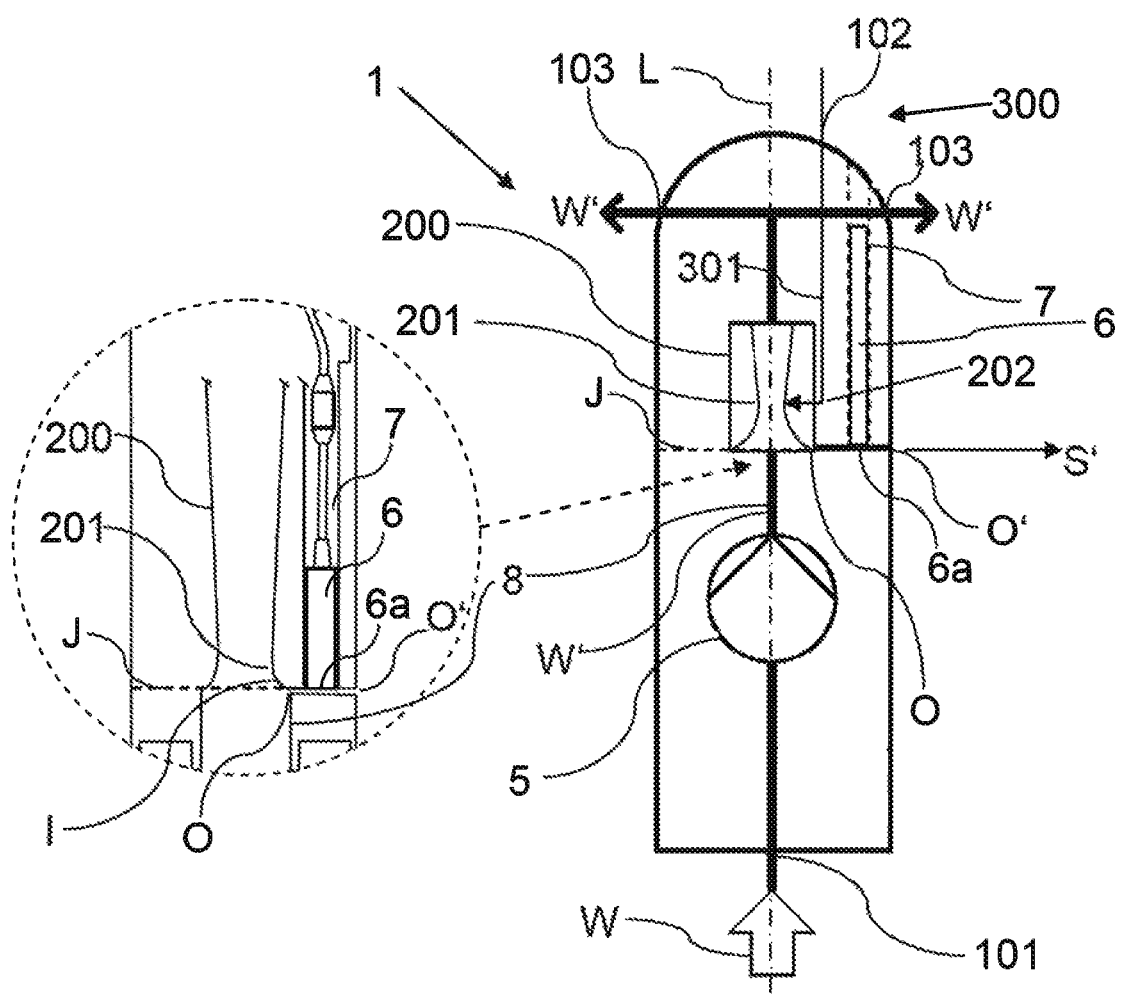
Figure 3:
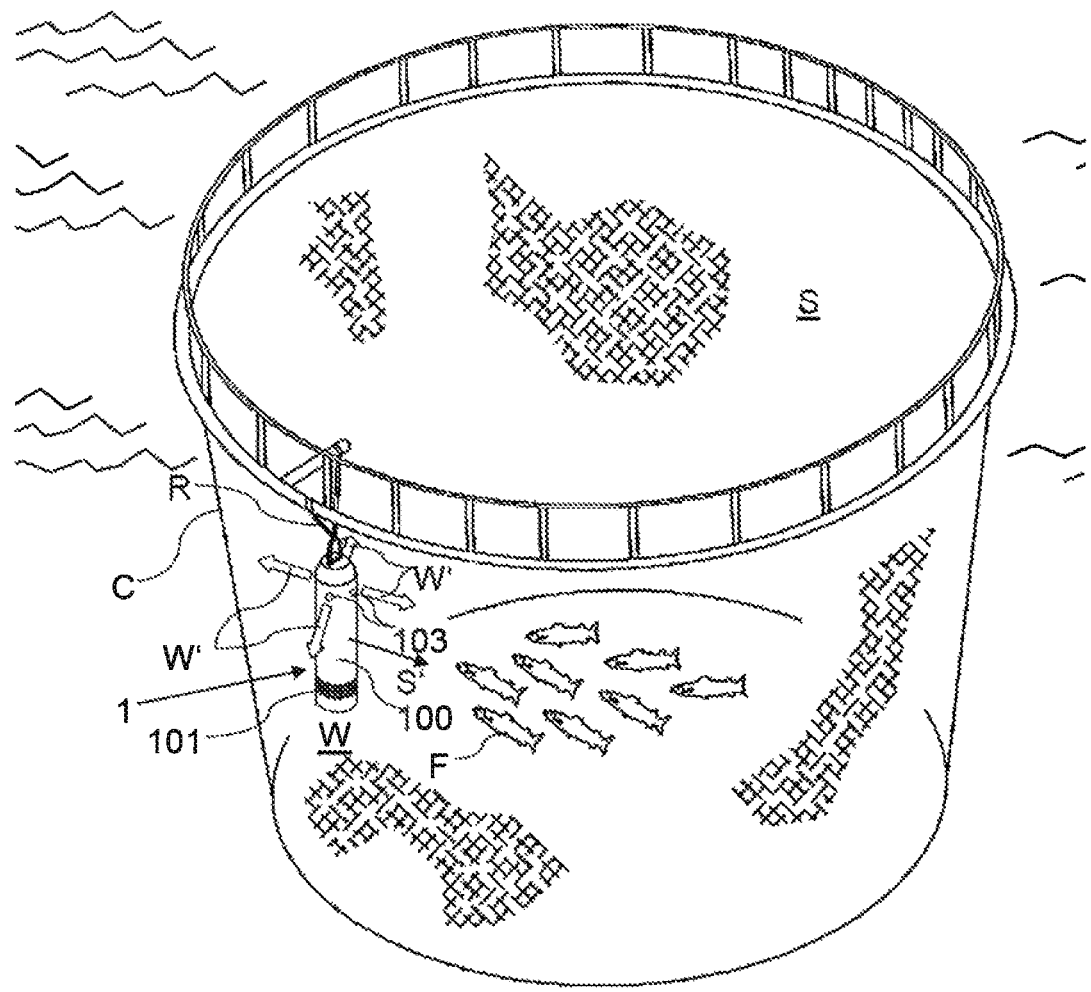

Further features, advantages and embodiments of the present invention shall be described in the following with reference to the Figures, wherein:

FIG. 1 a schematical view of a device according to the invention;

FIG. 2 a schematical cross sectional view of a device according to the invention; and FIG. 3 an illustration of the device according to the invention which is submerged into an open sea cage for fish farming.

FIG. 1 shows in conjunction with FIGS. 2 and 3 a device 1 according to the invention for dissolving a gas G, here e.g. oxygen, into a stretch of water S, here into a sea S, in which an open sea cage C for growing fish F is submerged, which fish shall be supplied with oxygen (cf. FIG. 3). The device 1 comprises a housing 100, that is configured to be submerged into the water W in the cage C, wherein the housing comprises at least one water inlet 101, a gas inlet 102 and at least one water outlet 103 for discharging gas enriched water W' out of the housing 100. Furthermore, the device 1 comprises a pump 5 that is in fluid communication with the at least one water inlet 101 for sucking water W from a surrounding of the housing 100, when the latter is submerged in the water W to be oxygenated, and wherein the pump 5 is configured to generate a main water stream W' that is passed via a pump outlet pipe 8 to a means 200 for injecting said gas G supplied via said gas inlet 102 into said main water stream W'. Particularly, said means 200 can comprise a Venturi nozzle for injecting the oxygen into the main water stream W.

Now, according to the invention the device 1 comprises an oxygen probe 6 that is configured to measure a concentration of said gas, here oxygen, dissolved in water, wherein said probe 6 is arranged in the housing 100 of the device 1.

Particularly, the probe 6 comprises a measuring surface 6a, such as a membrane or an optical surface, for measuring the oxygen concentration in a known manner.

Particularly, said surface 6a is arranged at a tip of the probe 6.

Preferably, the device 1 is configured to direct a side water stream S' of the main water stream W' along said measuring surface 6a. For this, the device 1 may comprise a first orifice O at a junction J between a pump outlet pipe 8 and said means (e.g. Venturi nozzle) 200, namely particularly at an inner surface I of said Venturi nozzle 200 that protrudes inwards towards a constriction 201 of said Venturi nozzle 200, such that said side water stream S' is forced through the first orifice O, is flushed over the measuring surface 61 of the probe 6, and is led through a second orifice O' exiting the housing 100. Particularly, said means 200 is arranged in a main body 115 (also denoted as nozzle section 115) of the device 1, see also below.

Particularly, the probe 6 is configured to be arranged in a recess 7 of the housing 100 in a removable fashion, which recess 7 ends in the conduit that extends from the first orifice O to the second orifice O'. Thus, when the probe 6 is arranged in said recess 7, the measuring surface 6a is essentially flush with an inner side of the conduit and is arranged downstream of the first orifice O and upstream of the second orifice O' so that said side water stream S' can be flushed in the conduit over said measuring surface 6a. Preferably, the device 1 further comprises a closure means e.g. in the form of a plastic part, that is configured to be arranged in a form fitting manner in said recess 7 when the probe 6 is not in use (and has been removed from the recess 7), wherein the closure means now blocks/seals the first orifice O when it is arranged in the recess 7, so that no side water stream S' is generated.

Particularly, the water outlets 103 of the device 1 are arranged on the housing 100 such that upon discharging water (e.g. the main water stream) W' through said water outlets 103 out of the housing 100, the repulsive forces cancel each other so that the housing 100 can maintain essentially a constant position when submerged in water. The device 1 may comprise four such water outlets 103 which may be arranged along a periphery P of a shell 110 of the housing such that the outlets 103 are equidistantly spaced. Here, the outlets 103 may lie in a common plane that extends perpendicular to a longitudinal axis L of the housing 100/shell 110.

Preferably, the housing 100 is suspended from a rope R, wherein the rope may be connected to an eye 111b arranged at an upper end 111a of a cap 111 of the housing 100.

In detail, the housing 100 comprises a circumferential (e.g. cylindrical) shell 110 that extends along a longitudinal/cylinder axis L, wherein at the upper end of the housing the shell 110 connects to said cap 111, and wherein at a lower end of the housing 100 the shell 110 connects to a bottom 112. In case the device is suspended as described above, the longitudinal axis L extends vertically, as shown e.g. in FIG. 3.

The cap 111 may comprise an opening for receiving a cable that may comprise the gas supply 300. Further the cable may also comprise a power supply for the individual components of the device 1 as well as a data line. The gas supply 301 connects to the gas inlet 102 located on the cap 111 and extends from there to said means 200, e.g. to an inlet 202 of a constriction 201 of a Venturi nozzle 200 via which the gas G can be injected into the main water stream W'.

Along the longitudinal axis L the components of the (suspended) device 1 may be arranged as follows: The water inlets 101 are arranged above the bottom 112 on a lower section 114 of the shell Mantels 110 of the housing 100. The pump 5 is preferably arranged above the water inlets 101 in a pump section 116 of the housing shell 110/housing 100, wherein said means 200 (e.g. Venturi nozzle) is arranged above the pump in a nozzle section 115 (main body) of the housing 100/shell 110, namely below the water outlets 103 that are arranged on the upper section 113 of the shell 110.

The Venturi nozzle 200 may extend along the longitudinal axis L so that the main water stream W' can enter the nozzle from below, pass the constriction 201, where gas G is dosed into the stream W', and exits the nozzle 200 so that the gas enriched water W' can be discharged via said water outlets 103, particularly so that the individual repulsive forces cancel each other (see above).

| Reference Numerals | |
|---|---|
| 1 | Device |
| 5 | Pump |
| 6 | Probe |
| 6a | Measuring surface |
| 7 | Recess |
| 8 | Pump outlet pipe |
| 100 | Housing |
| 101 | Water inlet |
| 102 | Gas inlet |
| 103 | Water outlet |
| 110 | Shell |
| 111 | Cap |
| 111a | Upper end |
| 111b | Eye |
| 112 | Bottom |
| 113 | Upper section |
| 114 | Lower section |
| 115 | Nozzle section (main body) |
| 116 | Pump section |
| 200 | Venturi nozzle |
| 201 | Constriction |
| 202 | Inlet |
| 300 | Gas supply |
| G | Gas |
| W | Water |
| W' | Main water stream/Gas enriched water |
| S | Sea |
| S' | Side water stream |
| C | Cage |
| F | Fish |
| P | Periphery |
| O | First orifice |
| O' | Second orifice |
| J | Junction |
| I | Inner surface |

The invention claimed is:

1. A device (1) for dissolving a gas (G) in water (W), comprising:

a housing (100) configured to be submerged into the water (W), the housing (100) including at least one water inlet (101), a gas inlet (102) and at least one water outlet (103) for discharging gas enriched water (W') out of the housing;

a pump (5) in fluid communication with the at least one water inlet (101) for sucking water (W) from a surrounding of the housing (100), the pump configured to generate a main water stream (W');

means (200) for injecting the gas (G) supplied from the gas inlet (102) into the main water stream (W'); and a probe (6) configured to measure a concentration of the gas dissolved in the water, the probe arranged in the housing (100) of the device (1) wherein the probe (6) comprises an oxygen probe configured to measure a concentration of dissolved oxygen in the water, and wherein the probe (6) comprises a measuring surface (6a) at a tip of the probe for measuring the concentration of the gas dissolved in the water;

and wherein the device (1) is configured to direct a side water stream (S') of the main water stream (W') along the measuring surface (6a).

2. The device according to claim 1, further comprising a first orifice (O) at a junction (J) between a pump outlet pipe (8) and the gas injecting means (200) of the device (1) for injecting the gas (G), such that the side water stream (S') is forced through the first orifice, flushed over the measuring surface (6a), and led through a second orifice (O') out of the housing (100) for generating the side water stream (S').

3. The device of claim 2, further comprising a recess (7) in the housing (100) in which the probe (6) is removably arranged, and the measuring surface (6a) is arranged downstream of the first orifice (O) and upstream of the second orifice (O') such that the side water stream (S') can be flushed over the measuring surface (6a).

4. The device of claim 3, further comprising closure means configured to be arranged in a form fitting manner in the recess (7) when the probe (6) has been removed from the recess, the closure means closing off the first orifice (O) when the closure means is arranged in the recess such that the side water stream (S') is not generated.

5. A method for dissolving a gas (G) in water (W), with a device (1) including a housing (100) configured to be submerged into the water (W), the housing (100) including at least one water inlet (101), a gas inlet (102) and at least one water outlet (103) for discharging gas enriched water (W') out of the housing, a pump (5) in fluid communication with the at least one water inlet (101) for sucking water (W) from a surrounding of the housing (100), the pump configured to generate a main water stream (W'), means (200) for injecting the gas (G) supplied from the gas inlet (102) into the main water stream (W'), and a probe (6) configured to measure a concentration of the gas dissolved in the water, the probe arranged in the housing (100) of the device (1), wherein the probe (6) comprises an oxygen probe configured to measure a concentration of dissolved oxygen in the water, and wherein the probe (6) comprises a measuring surface (6a) at a tip of the probe for measuring the concentration of the gas dissolved in the water;

and wherein the device (1) is configured to direct a side water stream (S') of the main water stream (W') along the measuring surface (6a), the method comprising:

submerging the device (1) in the water (W);

injecting the gas (G) into the main water stream (W'); and discharging gas enriched water (W') into the water (W) surrounding the device (1).

6. The method of claim 5, further comprising controlling the flow rate of the gas (G) injected into the main water stream (W') depending upon the concentration of the gas dissolved in the water (W) measured with the probe (6).

7. The method of claim 5, wherein the water (W) in which the device (1) is submerged is selected from the group consisting of waste water, and a stretch of water.

8. The method of claim 5, wherein the water (W) in which the device (1) is submerged is selected from the group consisting of water in a cage, water in an open sea cage (S), water in a sealed sea cage, water in a partly sealed sea cage, water in a container, and water in a pond.

9. The method of claim 5, wherein the gas (G) comprises oxygen.

\* \* \* \* \*